(12) United States Patent
Ponnampalam et al.

(10) Patent No.: US 8,098,754 B2
(45) Date of Patent: Jan. 17, 2012

(54) MIDAMBLE ALLOCATIONS FOR MIMO TRANSMISSIONS

(75) Inventors: Vishakan Ponnampalam, Bristol (GB); Martin W. Beale, Bristol (GB)

(73) Assignee: Sony Corporation, Tokyo (JP)

( * ) Notice: Subject to any disclaimer, the term of this patent is extended or adjusted under 35 U.S.C. 154(b) by 968 days.

(21) Appl. No.: 11/122,387

(22) Filed: May 4, 2005

(65) Prior Publication Data

US 2005/0249305 A1 Nov. 10, 2005

Related U.S. Application Data

(60) Provisional application No. 60/568,194, filed on May 4, 2004.

(51) Int. Cl.
| | |
|---|---|
| H04L 1/02 | (2006.01) |
| H04L 27/00 | (2006.01) |
| H04B 1/69 | (2011.01) |
| H04B 7/216 | (2006.01) |
| H04B 7/06 | (2006.01) |
| H04B 7/08 | (2006.01) |

(52) U.S. Cl. ........ 375/267; 375/299; 375/347; 375/149; 375/146; 375/145; 370/441; 455/101; 455/132

(58) Field of Classification Search .................. 375/295, 375/267, 299, 146, 260, 316, 347, 130, 140, 375/144, 147, 148; 370/335, 342, 441; 455/91, 455/101, 130, 132
See application file for complete search history.

(56) References Cited

U.S. PATENT DOCUMENTS

| | | | | |
|---|---|---|---|---|
| 6,018,555 | A * | 1/2000 | Mahany | 375/347 |
| 6,473,467 | B1 * | 10/2002 | Wallace et al. | 375/267 |
| 6,636,554 | B2 * | 10/2003 | Jechoux et al. | 375/141 |
| 6,687,492 | B1 * | 2/2004 | Sugar et al. | 455/276.1 |
| 6,735,188 | B1 * | 5/2004 | Becker et al. | 370/342 |
| 6,895,035 | B2 * | 5/2005 | Jechoux et al. | 375/141 |
| 6,907,272 | B2 * | 6/2005 | Roy | 455/562.1 |

(Continued)

FOREIGN PATENT DOCUMENTS

EP  99107118.4  4/1999

(Continued)

OTHER PUBLICATIONS

3rd Generation Partnership Project, "3GPP TS 25.221: Physical channels and mapping of transport channels onto physical channels (TDD)," version 6.5.0.

(Continued)

*Primary Examiner* — Tesfaldet Bocure
(74) *Attorney, Agent, or Firm* — Oblon, Spivak, McClelland, Maier & Neustadt, L.L.P.

(57) ABSTRACT

Allocation of multiple training sequences transmitted in a MIMO timeslot from multiple transmit antenna elements is provided. For example, a method of generating signals in a MIMO timeslot, the method comprising: selecting a first training sequence; preparing a first data payload; generating a first signal including the prepared first data payload and the first training sequence; transmitting the first signal in a MIMO timeslot from a first antenna of a network element; selecting a second training sequence, wherein the second training sequence is different from first training sequence; preparing a second data payload; generating a second signal including the prepared second data payload and the second training sequence; and transmitting the second signal in the MIMO timeslot from a second antenna of the network element.

19 Claims, 2 Drawing Sheets

U.S. PATENT DOCUMENTS

| | | | |
|---|---|---|---|
| 6,917,311 B2 * | 7/2005 | Hosur et al. ............... 341/50 |
| 7,027,817 B2 * | 4/2006 | Jechoux et al. ............ 455/450 |
| 7,031,344 B2 * | 4/2006 | Rakib et al. ............... 370/479 |
| 7,039,409 B2 | 5/2006 | Lobinger et al. |
| 7,065,136 B1 * | 6/2006 | Porter et al. ............... 375/232 |
| 7,095,731 B2 * | 8/2006 | Kim et al. .................. 370/342 |
| 7,149,239 B2 | 12/2006 | Hudson |
| 7,161,896 B1 * | 1/2007 | Hart et al. .................. 370/206 |
| 7,177,298 B2 | 2/2007 | Chillariga et al. |
| 7,194,237 B2 * | 3/2007 | Sugar et al. ............... 455/39 |
| 7,200,124 B2 | 4/2007 | Kim et al. |
| 7,203,461 B2 | 4/2007 | Chang et al. |
| 7,233,773 B2 * | 6/2007 | Hansen et al. ............. 455/69 |
| 7,274,759 B2 * | 9/2007 | Meehan et al. ............ 375/347 |
| 2002/0163893 A1 | 11/2002 | Jeschke |
| 2002/0191535 A1 * | 12/2002 | Sugiyama et al. ......... 370/208 |
| 2003/0058925 A1 * | 3/2003 | Jechoux et al. ............ 375/142 |
| 2003/0125061 A1 | 7/2003 | Bysted et al. |
| 2003/0218973 A1 | 11/2003 | Oprea et al. |
| 2003/0224791 A1 * | 12/2003 | Choi et al. ................. 455/436 |
| 2004/0023621 A1 * | 2/2004 | Sugar et al. ............... 455/103 |
| 2004/0120411 A1 * | 6/2004 | Walton et al. ............. 375/260 |
| 2004/0136464 A1 * | 7/2004 | Suh et al. ................... 375/260 |
| 2004/0179507 A1 * | 9/2004 | Batra et al. ................ 370/343 |
| 2004/0196782 A1 * | 10/2004 | Pan et al. ................... 370/210 |
| 2004/0209579 A1 * | 10/2004 | Vaidyanathan ............ 455/101 |
| 2004/0240571 A1 * | 12/2004 | Murakami et al. ........ 375/260 |
| 2005/0035885 A1 * | 2/2005 | Hosur et al. ............... 341/50 |
| 2005/0111405 A1 | 5/2005 | Kanterakis |
| 2005/0135318 A1 | 6/2005 | Walton et al. |
| 2005/0136935 A1 * | 6/2005 | Hosur et al. ............... 455/452.1 |
| 2005/0141624 A1 * | 6/2005 | Lakshmipathi et al. ... 375/260 |
| 2005/0153723 A1 * | 7/2005 | Hosur et al. ............... 455/515 |
| 2005/0220000 A1 * | 10/2005 | Kim et al. .................. 370/207 |
| 2005/0249305 A1 * | 11/2005 | Ponnampalam et al. .. 375/267 |
| 2005/0250506 A1 | 11/2005 | Beale |
| 2006/0083332 A1 * | 4/2006 | Dolmans et al. ........... 375/299 |
| 2006/0135147 A1 * | 6/2006 | Li et al. ..................... 455/422.1 |
| 2006/0182191 A1 * | 8/2006 | Darwood et al. .......... 375/267 |
| 2006/0245398 A1 | 11/2006 | Li et al. |
| 2007/0153922 A1 * | 7/2007 | Dong et al. ................ 375/260 |
| 2007/0165521 A1 * | 7/2007 | Malik et al. ............... 370/229 |
| 2007/0224947 A1 * | 9/2007 | Campbell et al. ......... 455/101 |

FOREIGN PATENT DOCUMENTS

| | | |
|---|---|---|
| EP | 1185048 A2 | 3/2002 |
| KR | 2000-71660 | 11/2000 |
| KR | 2001-32655 | 4/2001 |
| KR | 2004-11474 | 2/2004 |
| WO | WO9930234 | 6/1999 |
| WO | WO-00/18029 A1 | 3/2000 |
| WO | WO-01/58041 A1 | 8/2001 |
| WO | WO02076053 | 9/2002 |
| WO | WO-03/061150 A1 | 7/2003 |
| WO | WO-2005/107098 A1 | 11/2005 |

OTHER PUBLICATIONS

International Search Report and Written Opinion mailed Jul. 27, 2005, for PCT Application No. PCT/EP2005/052061 filed May 4, 2005, 12 pages.

International Search Report and Written Opinion mailed Jul. 6, 2005, for PCT Application No. PCT/EP2005/051772 filed Apr. 21, 2005, 12 pages.

"3rd Generation Partnership Project; Technical Specification Group Radio Access Network; Multiplexing and Channel Coding (FDD) (Release 6)," (Mar. 2005). 3GPP:Valbonne, France, TS 25.212 v6.4.0:1-85.

English Translation of Korean Notice Requesting Submission of Opinion; Sep. 5, 2009.

Communication Pursuant to Article 94(3) EPC from European Patent Application No. 05 740 256.2-1246 dated Nov. 23, 2009.

English Translation of Korean Notice Requesting Submission of Opinion; Sep. 5, 2009.

* cited by examiner

MIDAMBLE ALLOCATIONS FOR MIMO TRANSMISSIONS

CROSS-REFERENCE TO RELATED APPLICATIONS

This application claims the benefit of U.S. Provisional Application Ser. No. 60/568,194, filed May 4, 2004, the disclosure of which is incorporated herein by reference in its entirety.

BACKGROUND OF THE INVENTION

1. Field of the Invention

The present invention relates to demodulation of radio signals from a transmitter having collocated transmit antennas, and more particularly to distinguishing signals transmitted in a MIMO timeslot from multiple antennas.

2. Description of Related Art

Bursts belonging to a Time Division Multiple Access (TDMA) system consists of a training sequence and a guard period in addition to the data payload. The training sequence may occur at the start of the burst (preamble), middle of the burst (midamble), or end of the burst (post-amble). In general there may be multiple training sequences within a single burst. The training sequence used in a mobile radio system is typically a midamble. The guard period is placed at the start and/or end of a burst to reduce interference arising from dispersive channels.

In Code Division Multiple Access (CDMA) systems, multiple bursts may be transmitted simultaneously over a Time Slot (TS), each spread by a distinct signature sequence or channelization code. In a Time Division-Code Division Multiple Access (TD-CDMA) system, such as UTRA TDD, a mapping between a channelization code and a midamble is defined such that the channelization code of a burst may be derived implicitly using its midamble sequence.

However, although training sequences may facilitate reception, the use of training sequences tends to be suboptimal in many communication systems. Particularly, in MIMO systems a suboptimal performance tends to be achieved.

Hence, an improved system for generating signals in a MIMO timeslot would be advantageous and in particular a system allowing increased flexibility, reduced complexity and/or improved performance would be advantageous.

SUMMARY

Accordingly, the invention seeks to mitigate, alleviate or eliminate one or more of the abovementioned disadvantages singly or in any combination.

An accordance with a first aspect of the invention, there is provided a method of generating signals in a MIMO timeslot, the method comprising: selecting a first training sequence; preparing a first data payload; generating a first signal including the prepared first data payload and the first training sequence; transmitting the first signal in a MIMO timeslot from a first antenna of a network element; selecting a second training sequence, wherein the second training sequence is different from first training sequence; preparing a second data payload; generating a second signal including the prepared second data payload and the second training sequence; and transmitting the second signal in the MIMO timeslot from a second antenna of the network element.

Some embodiments of the invention provide a method to uniquely identify which of multiple base station antennas transmits a timeslot burst of data.

Some embodiments of the present invention provide a non-overlapping set of midambles that are allocated to bursts transmitted from each transmitter antenna element. Thus, midambles used on one antenna are not used on other antennas of the base station.

Some embodiments of the present invention provide a common midamble sequence is allocation for all bursts transmitted from a transmitter antenna element simultaneously. While other embodiments of the present invention provide a distinct midamble allocation for each burst transmitted simultaneously.

Some embodiments of the present invention provide a midamble sequence allocation that is fixed for each transmitter antenna element.

Some embodiments of the present invention allow the number of bursts transmitted from each transmitter antenna to be either partially (i.e. with ambiguity) or fully (i.e. without ambiguity) derived from the midamble sequences allocated to the bursts.

Some embodiments of the present invention provide a set of distinct midamble sequences allocated to bursts transmitted simultaneously that are chosen such that MIMO channels can be estimated accurately and efficiently.

Some embodiments of the present invention provide a method of midamble allocation is applied to a UTRA TDD system.

Some embodiments of the present invention further provide a for transmitting a first indication of an association between the selected first training sequence and the first antenna.

Some embodiments of the present invention further provide a for transmitting a second indication of an association between the selected second training sequence and the second antenna.

Some embodiments of the present invention further provide wherein the transmitting the indication includes signalling the indication in a control channel message.

Some embodiments of the present invention further provide a for selecting a third training sequence, wherein the third training sequence is different from second training sequence; and preparing a third data payload; wherein the generating of the first signal further includes the prepared third data payload and the third training sequence.

Some embodiments of the present invention further provide a for preparing a fourth data payload; wherein the generating of the second signal further includes the prepared fourth data payload and the third training sequence.

Some embodiments of the present invention further provide wherein the selecting of the first training sequence includes selecting of the first training sequence based on a total number of data payloads included in the first signal.

Some embodiments of the present invention further provide wherein the selecting of the second training sequence includes selecting of the second training sequence based on a total number of data payloads included in the second signal.

Some embodiments of the present invention further provide for selecting a first channelization code for the first data payload; wherein the preparing a first data payload includes applying the selected first channelization code; and wherein the selecting of the first training sequence includes selecting of the first training sequence based on the selected first channelization code.

Some embodiments of the present invention further provide for determining a burst type; wherein the selecting of the first training sequence is based on the determined burst type.

Some embodiments of the present invention further provide wherein the selecting of the first training sequence is based on a total number of transmit antennas NT.

Some embodiments of the present invention further provide wherein the first training sequence is a midamble sequence.

Some embodiments of the present invention further provide wherein the first training sequence is a preamble sequence.

Some embodiments of the present invention further provide wherein the first training sequence is a post-amble sequence.

Some embodiments of the present invention further provide wherein the network element is a base station.

Some embodiments of the present invention further provide wherein the network element is a mobile terminal.

Some embodiments of the present invention further provide wherein: the preparing of the first data payload includes: channelizing the first data payload with a channelization code; and puncturing the channelized first data payload with a first punching scheme; the preparing of the second data payload includes: channelizing the second data payload with the channelization code; and puncturing the channelized second data payload with a second punching scheme, wherein the second punching scheme differs from the first punching scheme; and the second data payload is the same as the first data payload.

Some embodiments of the present invention further provide wherein: the selecting of the first training sequence includes selecting a first plurality of training sequences; the preparing of the first data payload includes preparing a first plurality of data payloads; the generating the first signal includes generating the first signal including the prepared first plurality of data payload and the first plurality of training sequences; the selecting of the second training sequence includes selecting a second plurality of training sequences, wherein each of the selected training sequences in the second plurality of training sequences is different from each of the selected training sequences in the first plurality of training sequences; the preparing the second data payload includes preparing a second plurality of data payloads; and the generating the second signal includes generating the second signal including the prepared second plurality of data payloads and the second plurality of training sequences.

According to a second aspect of the invention, there is provided a method of processing signals in a MIMO timeslot, wherein the MIMO timeslot includes a first burst from a first transmit antenna and a second burst from a second transmit antenna, wherein the first and second bursts each contain one or more data payloads each encoded with a respective code, and wherein each payload corresponds to a midamble, the method comprising: receiving a signal in the MIMO timeslot; detecting a first midamble in the signal; extracting out a first payload transmitted from the first transmit antenna of a network element based on the detected first midamble; detecting a second midamble in the signal, wherein the second midamble is different from the first midamble; and extracting out a second payload transmitted from the second transmit antenna of the network element based on the detected second midamble.

Some embodiments of the present invention further provide for: characterizing a first channel formed between the first transmit antenna and the receiver using the detected first midamble; and extracting out a third payload transmitted from the first transmit antenna.

Some embodiments of the present invention provide a method of selecting training sequence for a burst, the method comprising: determining a number of transmit antennas of a base station; determining an antenna from the number of transmit antennas to transmit the burst; determining a training sequence length; and selecting a training sequence based on the determined number of transmit antennas, the determined antenna and the determined training sequence length.

Some embodiments of the present invention provide a method of selecting training sequence for a burst, the method comprising: determining a number of transmit antennas of a base station; determining an antenna from the number of transmit antennas to transmit the burst; determining a number of payloads to be transmitted in a MIMO timeslot from the determined antenna; and selecting a training sequence based on the determined number of transmit antennas, the determined antenna and the determined number of payloads.

Some embodiments of the present invention provide a method of selecting training sequence for a burst, the method comprising: determining a number of transmit antennas of a base station; determining an antenna from the number of transmit antennas to transmit the burst; determining a code to encode a payload; and selecting a training sequence based on the determined number of transmit antennas, the determined antenna and the determined code.

According to a third aspect of the invention, there is provided an apparatus for generating signals in a MIMO timeslot, the apparatus comprising: means for selecting a first training sequence; means for preparing a first data payload; means for generating a first signal including the prepared first data payload and the first training sequence; means for transmitting the first signal in a MIMO timeslot from a first antenna of a network element; means for selecting a second training sequence, wherein the second training sequence is different from first training sequence; means for preparing a second data payload; means for generating a second signal including the prepared second data payload and the second training sequence; and means for transmitting the second signal in the MIMO timeslot from a second antenna of the network element.

It will be appreciated that the optional features, comments and/or advantages described above with reference to the method for generating signals apply equally well to the apparatus for generating signals and that the optional features may be included in the apparatus for generating signals individually or in any combination.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

Embodiments of the invention will be described, by way of example only, with reference to the drawings, in which.

DETAILED DESCRIPTION

Figure 1:
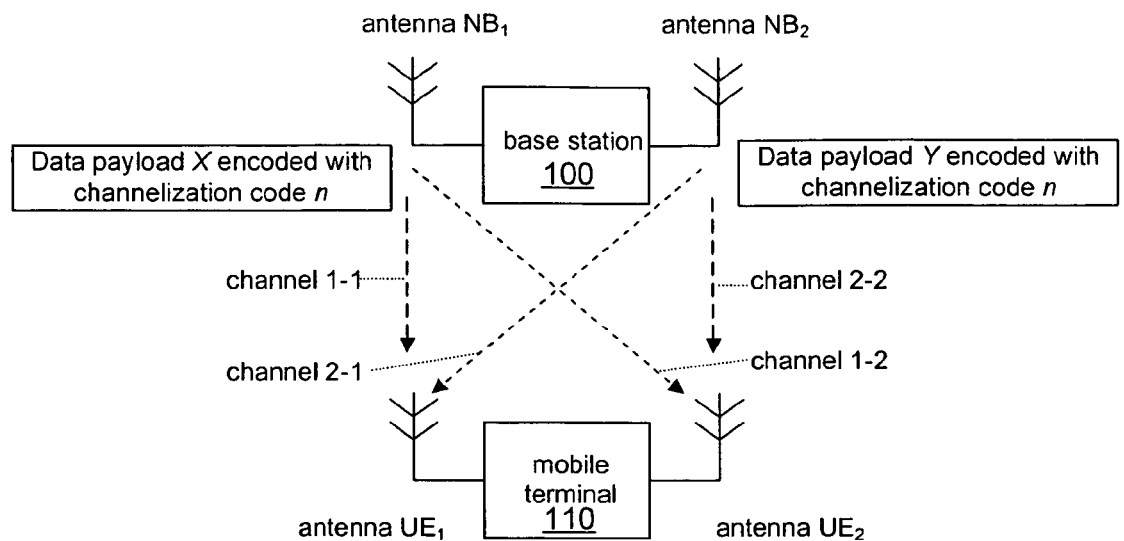
FIG. 1 shows an example of a MIMO system including a base station with two transmit antennas and a mobile terminal with two receive antennas.

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Several embodiments of the invention are described below. These embodiments are described with reference to 3GPP UTRA TDD systems, specifications and recommendations, but are applicable more generally.

A midamble is a sequence having special numeric properties, which are either known to or may be derived by a receiver. A receiver may be able to estimate a channel that a burst passes through using its knowledge of what was transmitted as the training sequence segment of the burst. The data payload may be detected and demodulated reliably based on the knowledge of the channel. Thought concepts described herein are described with reference to midambles, a training sequence placed at other locations of a burst are also applicable. For example, the training sequence may be placed at the beginning of the burst (preamble) or at the end of the burst (post-amble). Apart from its primary purpose of enabling channel estimation, a training sequence, such as a midamble, may also be used to carry information that assists a receiver in detecting and demodulating data payload.

A CDMA-receiver may provide improved performance when it has knowledge of active channelization codes used in a burst. For example, in UTRA TDD, the receiver is able to implement Multi-User Detection (MUD) with a list of active channelization codes derived from midambles detected in a timeslot.

Multiple-Input-Multiple-Output (MIMO) transmissions schemes employ multiple antenna elements at a transmitter and at a receiver to improve spectral efficiency. The receiver estimates each channel between each transmitter-receiver antenna element pair. A channel in a system with a transmitter having multiple transmit antennas and a receiver having multiple receive antennas may be referred to as a MIMO channel.

Each burst is transmitted from a single transmit antenna of a transmitter having multiple transmit antennas. Antenna elements are physically spaced such that the MIMO channels are sufficiently uncorrelated. For example, transmit antennas may be spaced by at least one-half of a wavelength. An example of a MIMO system may be a system consisting of a single base station having two transmit antennas and a mobile terminal that has two receive antennas.

FIG. 1 shows a single base station 100 that has two antennas labeled antenna $NB_1$ and antenna $NB_2$ and a mobile terminal 110 that has two antennas labeled antenna $UE_1$ and antenna $UE_2$. This transmitter-receiver system has four MIMO channels. Channel 1-1 exists between antenna $NB_1$ and antenna $UE_1$. Channel 1-2 exists between antenna $NB_1$ and antenna $UE_2$. Channel 2-1 exists between antenna $NB_2$ and antenna $UE_1$. Channel 2-2 exists between antenna $NB_2$ and antenna $UE_2$.

In general, an actual MIMO system includes multiple base stations servicing a number of mobile terminals. Therefore, multiple MIMO channels will exist among antenna elements of these multiple network elements.

Introducing diversity, utilizing spatial multiplexing or through a combination of both diversity and spatial multiplexing may improve spectral efficiency in a MIMO system. Diversity gain may be obtained when two or more bursts carrying the same information are transmitted from different transmitter antenna elements; a receiver may be able to combine replicas of the same information that have passed through different channels.

On the other hand, by taking advantage of spatial multiplexing, it may also be possible in a MIMO system to reliably detect up to $\min(N_T, N_R)$ bursts spread with a common channelization code transmitted on distinct antenna elements, where $N_T$ and $N_R$ denote a number of transmit and receive antennas respectively. Through the use of MIMO transmissions, it may be possible to transmit multiple bursts having a common channelization code where each burst is transmitted from a different transmit antenna.

For example, in FIG. 1, a base station 100 may transmit a burst containing payload data X using channelization code n from antenna $NB_1$, which is received by antennas $UE_1$ and $UE_2$. Base station 100 may simultaneously transmit a burst containing data Y using the same channelization code n from antenna $NB_2$, which is received by antennas $UE_1$ and $UE_2$. Furthermore, a mobile terminal 110 may decode both transmissions from antennas $NB_1$ and $NB_2$ and decode both data X and data Y.

Alternatively, a MIMO system may transmit different versions of the same data X from antennas $NB_1$ and $NB_2$. For example, if data X is convolutionally coded and then punctured, antennas $NB_1$ and $NB_2$ may transmit differently punctured versions $X_1$ and $X_2$ of the data X. Consequently, a transmitter and a receiver may communicate up to $\min(N_T, N_R)$ times more bursts within a MIMO timeslot as compared to a single-antenna (non-MIMO) transmitter-receiver pair.

In existing non-MIMO systems, such as Release 5 UTRA TDD, a maximum number of midambles that can be transmitted in a timeslot is equal to a maximum number of channelization codes that are to be transmitted in the timeslot. This allows a channel estimate to be derived at the receiver for each channelization code.

For example, there are several midamble allocation schemes that exist in UTRA TDD mode as defined in the $3^{rd}$ Generation Partnership Project (3GPP) document 3GPP TS 25.221 titled "Physical channels and mapping of transport channels onto physical channels (TDD)", hereinafter 3GPP TS 25.221. Midamble allocation schemes are also described in corresponding patent application filed on May 4, 2004, (U.S. patent application Ser. No. 10/838,983) and titled "Signalling MIMO Allocations", which is incorporated herein by reference.

Some midamble allocation schemes provide a one-to-one relationship between bursts in a timeslot and their corresponding channelization codes. A mapping of a midamble sequence to a burst may be done through a mapping of burst channelization codes. That is, each midamble sequence is paired with a single channelization code. Similarly, each channelization code is paired with a single midamble sequence.

This one-to-one midamble allocation scheme is not applicable for general MIMO transmissions where a common channelization code is used in two or more bursts in a MEMO timeslot. Known schemes require a channelization code to be assigned a distinct midamble sequence such that a receiver is able to estimate the MIMO channel.

In FIG. 1, a MIMO receiver (mobile terminal 110) needs to be able to derive the MIMO channel for channelization code n at antenna $UE_1$ for both Channel 1-1 and Channel 2-1. Estimates for these two channels cannot be derived from a single midamble sequence. That is, if both bursts include the same midamble, a MIMO receiver is unable to distinguish the bursts and estimate the channels.

A common midamble allocation scheme applied to a single channel (non-MIMO) system allows a single midamble sequence to be transmitted for all bursts from a base station antenna to a mobile terminal antenna. The mobile terminal is able to derive a channel estimate for the single channel. This common midamble allocation scheme is not applicable to MIMO systems since a single receiver antenna will be unable to derive channel estimates for channels created by multiple transmit antennas. Hence, a new midamble allocation scheme is desired for MIMO transmission systems.

In some embodiments of the invention, bursts may be allocated a midamble sequence such that a receiver may be able to estimate a channel formed between a transmitter-receiver antenna pair in a MIMO system. In some embodiments of the present invention, at least one burst transmitted from each transmit antenna is allocated a midamble sequence that is not allocated to bursts transmitted from other antenna elements.

Figure 2:
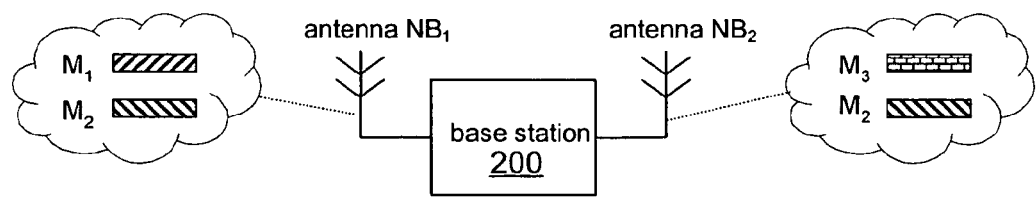
FIG. 2 illustrates a transmission of a disjoint set of midamble sequences, in accordance with the present invention.

FIG. 2 illustrates a transmission of a disjoint set of midamble sequences, in accordance with the present invention. A base station 200 has two transmit antennas: antenna $NB_1$ and antenna $NB_2$. Base station 200 transmits midambles $M_1$ and $M_2$ from antenna $NB_1$. Base station 200 also transmits midambles $M_2$ and $M_3$ from antenna $NB_2$. Midamble $M_1$ is not transmitted from antenna $NB_2$ but is transmitted from antenna $NB_1$. Similarly, midamble $M_3$ is not transmitted from antenna $NB_1$ but is transmitted from antenna $NB_2$. Whereas, midamble $M_2$ is transmitted from both antenna $NB_1$ and antenna $NB_2$.

According to some embodiments, midamble codes may be reused in a MIMO timeslot on different antennas. If a transmitter transmits a first signal from a first antenna $NB_1$ with midambles $M_1$ and $M_2$ (as shown in FIG. 2) and a second signal from a second antenna $NB_2$ with midambles $M_3$ and $M_2$, midamble $M_2$ is reused. A receiver may use a channel characterized by midamble $M_1$ to retrieve payload data associated with both midambles $M_1$ and $M_2$ from the first antenna $NB_1$. Similarly, the receiver may use a channel characterized by midamble $M_3$ to retrieve payload data associated with both midambles $M_3$ and $M_2$ from the second antenna $NB_2$.

In some embodiments of the invention, a mapping of midambles to transmitter antenna elements is signaled implicitly or explicitly to the receiver. For example, a receiver may derive a mapping implicitly through the combination of distinct midambles it detects simultaneously. Alternatively, a mapping may be signaled to the receiver explicitly through control channels.

In some embodiments of the invention, a receiver estimates MIMO channels corresponding to each transmit-receive antenna pair. A receiver may consider all distinct midamble sequences transmitted simultaneously.

A unique midamble sequence is allocated to a set of bursts of a timeslot transmitted from a transmit antenna. That is, a midamble sequence $m^{[i]}$ allocated to a set of bursts transmitted simultaneously from an i-th transmitter antenna element is chosen from a set of midamble sequences $M_i$ such that the sets $M_1, M_2 \ldots M_{N_T}$ are non-overlapping. In these embodiments, no midamble sequence in set $M_i$ is equal to a midamble in set $M_j$ for $i \neq j$.

In some embodiments of the invention, a fixed midamble sequence $m^{[i]}$ is assigned to all bursts transmitted from a transmit antenna during a timeslot. For example, a midamble sequence defined in 3GPP TS 25.221 with $K_{Cell}=6$ and Burst type=2 and $K_{Cell}=4$, 8 or 16 with Burst types=1 and 3 may be allocated as given in TABLE 1 where $N_T$ represents a number of transmit antennas. The midamble shifts are enumerated as per Clause 5A.2.3 of 3GPP TS 25.212.

Figure 3:
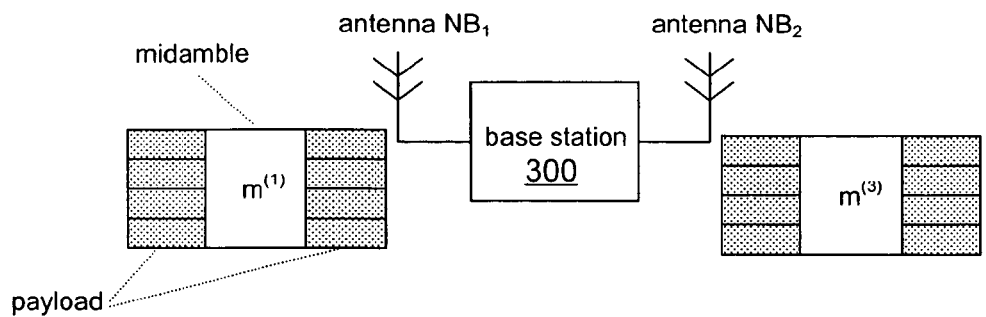
FIG. 3 illustrates a transmission of fixed midambles, in accordance with the present invention.

TABLE 1 and FIG. 3 show a first midamble allocation scheme. A midamble is selected based on a total number of transmit antennas ($N_T$) and based on which antenna the burst, containing the midamble, will be transmitted. The i-th antenna element uses the midamble sequence $m^{[i]}$, which may be selected from a group of midamble sequences $m^{(k)}$, where k is an index to the possible midamble sequences.

TABLE 1

Example of Fixed Midamble Allocation for MIMO Transmissions

| Total number of Antenna Elements $N_T$ | Burst Type 2 $L_m = 256, K_{cell} = 6$ $m^{[i]}$: k-th midamble $m^{(k)}$ is assigned bursts from antenna element i, where i = 1 to $N_T$ | | | | Burst Type 1 and 3 $L_m = 512, K_{cell} = 4, 8, 16$ $m^{[i]}$: k-th midamble $m^{(k)}$ is assigned to burst from antenna element i, where i = 1 to $N_T$ | | | |
|---|---|---|---|---|---|---|---|---|
| 2 | $m^{[1]} = m^{(1)}$ | $m^{[2]} = m^{(3)}$ | | | $m^{[1]} = m^{(1)}$ | $m^{[2]} = m^{(5)}$ | | |
| 4 | $m^{[1]} = m^{(1)}$ | $m^{[2]} = m^{(3)}$ | $m^{[3]} = m^{(2)}$ | $m^{[4]} = m^{(4)}$ | $m^{[1]} = m^{(1)}$ | $m^{[2]} = m^{(5)}$ | $m^{[3]} = m^{(3)}$ | $m^{[4]} = m^{(7)}$ |

A Burst Type=2 has a training sequence that is 256 chips long ($L_m$) in a UTRA TDD system. $K_{Cell}$ identifies which group of a midamble a sequence is selected. For example, $K_{Cell}=6$ means there are six midambles in the group.

Some embodiments of the present invention use a fixed allocation of midambles where each transmit antenna element of a transmitter is assigned a different midamble.

FIG. 3 illustrates transmission of fixed midambles in accordance with the present invention. In the example shown, base station 300 has two MIMO transmit antennas: antenna $NB_1$ and antenna $NB_2$. Additionally, assume that $K_{Cell}=6$ and Burst type=2. All bursts that are transmitted from antenna $NB_1$ are transmitted with midamble $m^{(1)}$. All bursts that are transmitted from antenna $NB_2$ are transmitted with midamble $m^{(3)}$. Midambles $m^{(1)}$ and $m^{(3)}$ are distinct.

One unique and different midamble may be used in each group a burst transmitted from multiple antennas in a MIMO timeslot. FIG. 3, for example, shows a first group of payloads being transmitted with a common midamble $m^{(1)}$ on a first antenna $NB_1$. Each of the payloads may be encoded with a channelization code. A second antenna $NB_2$ is used to transmit different payloads. The different payloads have a common midamble $m^{(3)}$. Channelization codes used to encode the payloads on $NB_1$ may all be the same, partially the overlapping or all different than the codes used to encode the payloads on $NB_2$.

In some embodiments of the invention, a common midamble sequence $m^{[i]}$ is allocated to all bursts transmitted from the i-th antenna element and may be chosen from the set $M_i$ based on a number of bursts transmitted from the transmit antenna.

A set of bursts transmitted simultaneously from a transmit antenna are allocated a midamble sequence that is determined by the size of the set of data payloads. For a given number of transmit antennas $N_T$, a function $f_{N_T}(i, n_i)$ maps the transmit antenna index i and a number of bursts $n_i$ transmitted from the i-th antenna element, to a midamble sequence $m^{[i]}$ where $m^{[i]}$ is defined as $m^{[i]}=f_{N_T}(i, n_i)$ such that $f_{N_T}(i, n_i) \neq f_{N_T}(j, n_j)$ if $i \neq j$. This ensures that a receiver is able to derive on which transmit antenna a midamble was transmitted without ambiguity. There may be, however, ambiguity in determining a total number of bursts transmitted from each transmit antenna. For example, a midamble sequences defined in 3GPP TS 25.221 with $K_{Cell}=16$ with Burst types=1 and 3 may be allocated as given in TABLE 2. The midamble shifts are enumerated as per Clause 5A.2.3 in 3GPP TS 25.212.

Figure 4:
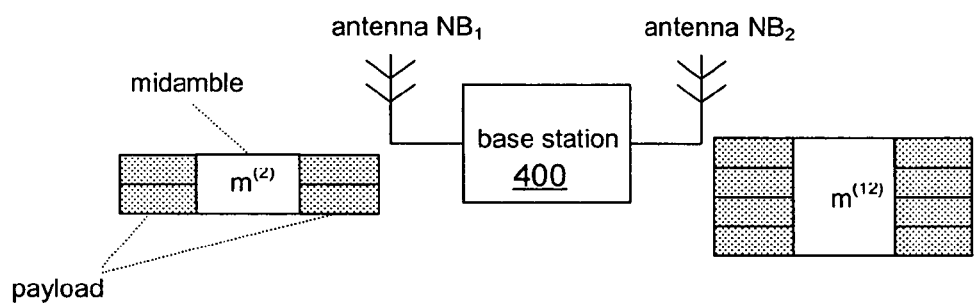
FIG. 4 illustrates a transmission of a common midamble, in accordance with the present invention.

TABLE 2 and FIG. 4 show a second midamble allocation scheme. A midamble is selected based on a total number of transmit antennas ($N_T$) and a number of bursts ($n_i$) that the timeslot will carry for a transmit antenna element.

sion from antenna $NB_1$ as realized from TABLE 2 above. Base station 400 also transmits payload data using four codes from antenna $NB_2$ and thus applies midamble $m^{(12)}$ for the transmission from antenna $NB_2$.

When the mobile terminal receives midamble $m^{(2)}$, it deduces that either two or ten codes are being transmitted from antenna $NB_1$. The mobile terminal then performs further signal processing to derive an actual number of codes transmitted from antenna $NB_1$. In this example, further signal processing by the mobile terminal should show that two codes were transmitted.

Similarly, when the mobile terminal receives midamble $m^{(12)}$, it deduces that either four or twelve codes are being transmitted from antenna $NB_2$. The mobile terminal then performs further signal processing to derive the actual number of codes transmitted from antenna $NB_2$. In this case four codes were transmitted. A midamble sequence used to signal a given number of codes as active on antenna $NB_1$ is distinct from any of the midamble sequences that are transmitted from antenna $NB_2$ and vice versa.

In some embodiments of the invention, a midamble allocated to a burst may be determined based on its corresponding channelization code and the transmit antenna from which it is transmitted.

Each burst is allocated a midamble sequence that is determined by which transmit antenna transmits the bursts and by its channelization code. For a given number of transmitter antenna elements, an association between a midamble sequence m, and the transmitter antenna element index i, the channelization code c may be defined through a mapping function $m=g(i, c)$ such that $g(i, c) \neq g(j, c')$ for $i \neq j$. This ensures that a receiver may unambiguously map midambles to a transmit antenna, however, there may be some ambiguity as to the channelization code used. For example, a midamble sequences defined in 3GPP TS 25.221 with $K_{Cell}=16$ and Burst types=1 and 3 may be allocated as given in TABLE 3.

Figure 5:
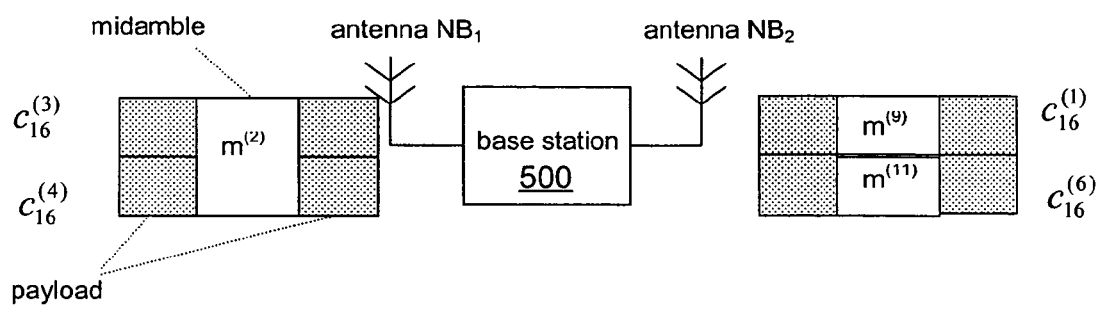
FIG. 5 illustrates a transmission of a default midamble, in accordance with the present invention.

TABLE 3 and FIG. 5 show a third midamble allocation scheme. A midamble is selected based on a total number of transmit antennas ($N_T$), in which antenna the burst, containing the midamble, will be transmitted and based on which channelization codes are included with the midamble in the burst. The list of codes is represented by $c_{16}^{(i\text{-}th)}$, which indicates that the i-th code from a list of codes is selected where the list contains 16 items.

TABLE 2

Example of Common Midamble Allocation for MIMO Transmissions

| Total number of Antenna Elements $N_T$ | $n_i$: Number of bursts on antenna element i | $m^{[i]}$ $m^{[i]}$: k-th midamble $m^{(k)}$ assigned to antenna element i, where i = 1 to $N_T$ | | | |
|---|---|---|---|---|---|
| 4 | $n_{1,2,3,4}$ = 1, 5, 9 or 13 | $m^{[1]} = m^{(1)}$ | $m^{[2]} = m^{(5)}$ | $m^{[3]} = m^{(9)}$ | $m^{[4]} = m^{(13)}$ |
|  | $n_{1,2,3,4}$ = 2, 6, 10 or 14 | $m^{[1]} = m^{(2)}$ | $m^{[2]} = m^{(6)}$ | $m^{[3]} = m^{(10)}$ | $m^{[4]} = m^{(14)}$ |
|  | $n_{1,2,3,4}$ = 3, 7, 11 or 15 | $m^{[1]} = m^{(3)}$ | $m^{[2]} = m^{(7)}$ | $m^{[3]} = m^{(11)}$ | $m^{[4]} = m^{(15)}$ |
|  | $n_{1,2,3,4}$ = 4, 8, 12 or 16 | $m^{[1]} = m^{(4)}$ | $m^{[2]} = m^{(8)}$ | $m^{[3]} = m^{(12)}$ | $m^{[4]} = m^{(16)}$ |
| 2 | $n_{1,2}$ = 1 or 9 | $m^{[1]} = m^{(1)}$ |  | $m^{[2]} = m^{(9)}$ |  |
|  | $n_{1,2}$ = 2 or 10 | $m^{[1]} = m^{(2)}$ |  | $m^{[2]} = m^{(10)}$ |  |
|  | $n_{1,2}$ = 3 or 11 | $m^{[1]} = m^{(3)}$ |  | $m^{[2]} = m^{(11)}$ |  |
|  | $n_{1,2}$ = 4 or 12 | $m^{[1]} = m^{(4)}$ |  | $m^{[2]} = m^{(12)}$ |  |
|  | $n_{1,2}$ = 5 or 13 | $m^{[1]} = m^{(5)}$ |  | $m^{[2]} = m^{(13)}$ |  |
|  | $n_{1,2}$ = 6 or 14 | $m^{[1]} = m^{(6)}$ |  | $m^{[2]} = m^{(14)}$ |  |
|  | $n_{1,2}$ = 7 or 15 | $m^{[1]} = m^{(7)}$ |  | $m^{[2]} = m^{(15)}$ |  |
|  | $n_{1,2}$ = 8 or 16 | $m^{[1]} = m^{(8)}$ |  | $m^{[2]} = m^{(16)}$ |  |

FIG. 4 illustrates a transmission of a common midamble in accordance with the present invention. A MIMO base station 400 has two transmit antennas. In the example shown, base station 400 transmits payload data using two codes from antenna $NB_1$ and thus applies midamble $m^{(2)}$ for a transmis-

TABLE 3

Example of Default Midamble Allocation

Selected Midamble Sequence for an antenna element

| $N_T$ Channelization Codes | | Antenna element #1 $m^{[1]}$ | Antenna element #2 $m^{[2]}$ | Antenna element #3 $m^{[3]}$ | Antenna element #4 $m^{[4]}$ |
|---|---|---|---|---|---|
| 2 | $c_{16}^{(1)}$ or $c_{16}^{(2)}$ | $m^{(1)}$ | $m^{(9)}$ | | |
|   | $c_{16}^{(3)}$ or $c_{16}^{(4)}$ | $m^{(2)}$ | $m^{(10)}$ | | |
|   | $c_{16}^{(5)}$ or $c_{16}^{(6)}$ | $m^{(3)}$ | $m^{(11)}$ | | |
|   | $c_{16}^{(7)}$ or $c_{16}^{(8)}$ | $m^{(4)}$ | $m^{(12)}$ | | |
|   | $c_{16}^{(9)}$ or $c_{16}^{(10)}$ | $m^{(5)}$ | $m^{(13)}$ | | |
|   | $c_{16}^{(11)}$ or $c_{16}^{(12)}$ | $m^{(6)}$ | $m^{(14)}$ | | |
|   | $c_{16}^{(13)}$ or $c_{16}^{(14)}$ | $m^{(7)}$ | $m^{(15)}$ | | |
|   | $c_{16}^{(15)}$ or $c_{16}^{(16)}$ | $m^{(8)}$ | $m^{(16)}$ | | |
| 4 | $c_{16}^{(1)}, c_{16}^{(2)}, c_{16}^{(3)}$ or $c_{16}^{(4)}$ | $m^{(1)}$ | $m^{(9)}$ | $m^{(2)}$ | $m^{(10)}$ |
|   | $c_{16}^{(5)}, c_{16}^{(6)}, c_{16}^{(7)}$ or $c_{16}^{(8)}$ | $m^{(3)}$ | $m^{(11)}$ | $m^{(4)}$ | $m^{(12)}$ |
|   | $c_{16}^{(9)}, c_{16}^{(10)}, c_{16}^{(11)}$ or $c_{16}^{(12)}$ | $m^{(5)}$ | $m^{(13)}$ | $m^{(6)}$ | $m^{(14)}$ |
|   | $c_{16}^{(13)}$ or $c_{16}^{(14)}, c_{16}^{(15)}$ or $c_{16}^{(16)}$ | $m^{(7)}$ | $m^{(15)}$ | $m^{(8)}$ | $m^{(16)}$ |

FIG. 5 illustrates a transmission of a default midamble in accordance with the present invention. A MIMO base station 500 has two transmit antennas. In the example shown, base station 500 transmits codes $c_{16}^{(3)}$ and $c_{16}^{(4)}$ from antenna $NB_1$ and thus applies midamble $m^{(2)}$ for the transmission from antenna $NB_1$ as may be realized from TABLE 3 above. Base station 500 also transmits codes $c_{16}^{(1)}$ and $c_{16}^{(6)}$ from antenna $NB_2$ and thus base station 500 applies midambles $m^{(9)}$ and $m^{(11)}$ for the burst associated to codes $c_{13}^{(1)}$ and $c_{16}^{(6)}$, respectively.

When a mobile terminal receives midamble $m^{(2)}$, it deduces that either $c_{16}^{(3)}$ or $c_{16}^{(4)}$ or both $c_{16}^{(3)}$ and $c_{16}^{(4)}$ are being transmitted from antenna $NB_1$. Similarly, when the mobile terminal receives midamble $m^{(9)}$, it deduces that either $c_{16}^{(1)}$ or $c_{16}^{(2)}$ or both $c_{16}^{(1)}$ and $c_{16}^{(2)}$ are being transmitted from antenna $NB_2$. Furthermore, when the mobile terminal receives midamble $m^{(11)}$, it deduces that either $c_{16}^{(5)}$ or $c_{16}^{(6)}$ or both $c_{16}^{(5)}$ and $c_{16}^{(6)}$ are being transmitted from antenna $NB_2$.

Some embodiments of the invention allow a receiver to estimate each MIMO channel between a transmitter-receiver antenna pair. Additionally, higher spectral efficiency of a network air interface is realized through a use of MIMO transmission techniques that achieve diversity, spatial multiplexing or a combination of both; and higher peak throughput over the network air interface through the use MIMO transmission techniques that achieve spatial multiplexing. This results in increased average throughput, increased number of users and lower transmission power per user.

Using a fixed or common midamble allocation scheme also allows channel estimation to be performed more accurately as a minimum number of distinct midambles is transmitted simultaneously. These schemes also reduce interference. Consequently, a performance and capacity of the network are improved further. Furthermore, these schemes may lower complexity of a mobile terminal. If bursts transmitted from the same transmit antenna are allocated a common midamble, the processing and memory requirements for channel estimation is reduced.

Midamble sequences may be allocated to bursts such that a receiver is able to estimate a channel formed between each transmit-receiver antenna pair. At least one burst transmitted from a particular antenna element may be allocated a midamble sequence that is not allocated to bursts transmitted from other transmitter antenna elements.

Processing prior to using a MUD may be used to determine which codes are transmitted in a burst or group of bursts in a timeslot or a MIMO timeslot. Signal processing, such as a matched filter, may be used to determine which codes are transmitted in a burst. Some methods inhere may be used to narrow down a list of possible codes transmitted.

According to some embodiments, a receiver may combine channel estimates from multiple channel estimates. For example, a receiver may determine a channel estimate based on a first midamble. A second midamble in the same timeslot from the same antenna may act as interferences during this channel estimate. Similarly, the receiver may determine a channel estimate based on the second midamble. The receiver may combine the results to form an improved channel estimate.

Channel estimates may be used to scale received signals from more than one antenna. A receiver may use a structure that is enhanced when signal powers are properly scaled. For example, a signal with 16 coded payloads from a first antenna may be scaled to a high amount than a second signal having a single coded payload from a second antenna received during the same MIMO timeslot.

While the invention has been described in terms of particular embodiments and illustrative figures, those of ordinary skill in the art will recognize that the invention is not limited to the embodiments or figures described. For example, many of the embodiments described above relate to communication on a downlink. Other embodiments are applicable to the uplink. That is, where the mobile terminal has a transmitter with multiple transmit antenna elements and the base station has a receiver with multiple receive antenna elements.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the scope of the appended claims. The description is not intended to be exhaustive or to limit the invention to the precise form disclosed. It should be understood that the invention can be practiced with modification and alteration and that the invention be limited only by the claims.

What is claimed is:

1. A method of communicating with a mobile terminal from a network element of a mobile radio network, the network element including a first antenna and a second antenna, the method comprising:
   a) receiving a request from the mobile terminal for a downlink channel;
   b) selecting at least one first training sequence from a set of training sequences for allocation to the first antenna;
      preparing at least one data payload;
      generating a first signal including the prepared at least one data payload and the at least one training sequence;
      transmitting the first signal in a MIMO timeslot forming the downlink channel from the first antenna of the network element to the mobile terminal; and
      in response to the request from the mobile terminal,
      selecting at least one second training sequence from the set of training sequences for allocation to the second antenna, wherein each of the selected training sequences of the at least one second training sequence is different from each of the selected training sequences of the at least one first straining sequence,
      preparing at least one second data payload,
      generating a second signal including the prepared at least one second data payload and the at least one second training sequence,
      transmitting to the mobile terminal the second signal in the MIMO timeslot from the second antenna of the network element simultaneously with the transmission of the first signal in the MIMO timeslot, and
      transmitting to the mobile terminal an indication of the selected second training sequence and the allocation to the second antenna;
   c) for corresponding MIMO timeslots in a same position in subsequent frames to that of the MIMO timeslot using each of the at least one first training sequence only for transmissions from the first antenna of the network element, and using each of the at least one second training sequence only for transmissions from the second antenna of the network element.

2. The method of claim 1, wherein the transmitting the indication includes signaling the indication in a control channel message.

3. The method of claim 1, further comprising:
   selecting a third training sequence, wherein the third training sequence is different from the at least one second training sequence; and
   preparing a third data payload;
   wherein the generating of the first signal further includes the prepared third data payload and the third training sequence.

4. The method of claim 3, further comprising:
   preparing a fourth data payload;
   wherein the generating of the second signal further includes the prepared fourth data payload and the third training sequence.

5. The method of claim 1, wherein the selecting of the at least one first training sequence includes selecting of the at least one first training sequence based on a total number of data payloads included in the first signal.

6. The method of claim 5, wherein the selecting of the at least one second training sequence includes selecting of the at least one second training sequence based on a total number of data payloads included in the second signal.

7. The method of claim 1, further comprising:
   selecting a first channelization code for the at least one first data payload;
   wherein the preparing at least one first data payload includes applying the selected first channelization code; and
   wherein the selecting of the at least one first training sequence includes selecting of the at least one first training sequence based on the selected first channelization code.

8. The method of claim 1, further comprising:
   determining a burst type;
   wherein the selecting of the at least one first training sequence is based on the determined burst type.

9. The method of claim 1, wherein the selecting of the at least one first training sequence is based on a total number of transmit antennas NT.

10. The method of claim 1, wherein the at least one first training sequence comprises at least one midamble sequence.

11. The method of claim 1, wherein the at least one first training sequence comprises at least one preamble sequence.

12. The method of claim 1, wherein the at least one first training sequence comprises at least one post-amble sequence.

13. The method of claim 1, wherein the network element is a base station.

14. The method of claim 1, wherein the network element is another mobile terminal.

15. The method of claim 1, wherein:
   the preparing of the at least one first data payload includes:
      channelizing the at least one first data payload with a channelization code; and
      puncturing the channelized at least one first data payload with a first puncturing scheme;
   the preparing of the at least one second data payload includes:
      channelizing the at least one second data payload with the channelization code; and
      puncturing the channelized at least one second data payload with a second puncturing scheme, wherein the second puncturing scheme differs from the first puncturing scheme; and
   the at least one second data payload is the same as the at least one first data payload.

16. The method of claim 1, wherein the at least one first and the at least one second training sequences are selected further based on the first antenna and the second antenna, respectively, and a first and second channelization code, respectively.

17. The method of claim 1, wherein the at least one first and the at least one second training sequences are selected based on a predetermined training sequence allocation scheme.

18. A network element of a mobile radio network for communicating with a mobile terminal, the network element comprising:
   a receiver configured to receive a request from the mobile terminal for a downlink channel;
   a first antenna;
   a second antenna;
   a transmitter operably coupled to the first antenna and the second antenna and configured to:
   select at least one first training sequence from a set of training sequences for allocation to the first antenna;
   prepare at least one data payload;
   generate a first signal including the prepared at least one data payload and the at least one first training sequence;

transmit the first signal in a MIMO timeslot from the first antenna to the mobile terminal; and in response to the request from the mobile terminal, select at least one second training sequence from the set of training sequences for allocation to the second antenna, wherein each of the selected training sequences of the at least one second training sequence is different from each of the selected training sequences of the at least one first training sequence, prepare at least one second data payload, generate a second signal including the prepared at least one second data payload and the at least one second training sequence, transmit to the mobile terminal the second signal in the MIMO timeslot from the second antenna simultaneously with the transmission of the first signal in the MIMO timeslot, and transmit to the mobile terminal an indication of the selected second training sequence and the allocation to the second antenna, wherein the transmitter is further configured for corresponding MIMO timeslots in a same position in subsequent frames to that of the MIMO timeslot to use each of the at least one first training sequence only for transmissions from the first antenna and each of the at least one second training sequence only for transmissions from the second antenna.

19. The network element of claim 18, wherein the transmitter comprises a base-station transmitter.

* * * * *